Aug. 11, 1970   J. S. SINKULE ET AL   3,523,699
IMPLEMENT CARRIER

Filed Oct. 23, 1967   4 Sheets-Sheet 1

INVENTORS
JAMES SINKULE,
WILLIAM J. SINKULE &
JIM SINKULE

BY Baldwin Wight Diller & Brown
ATTORNEYS

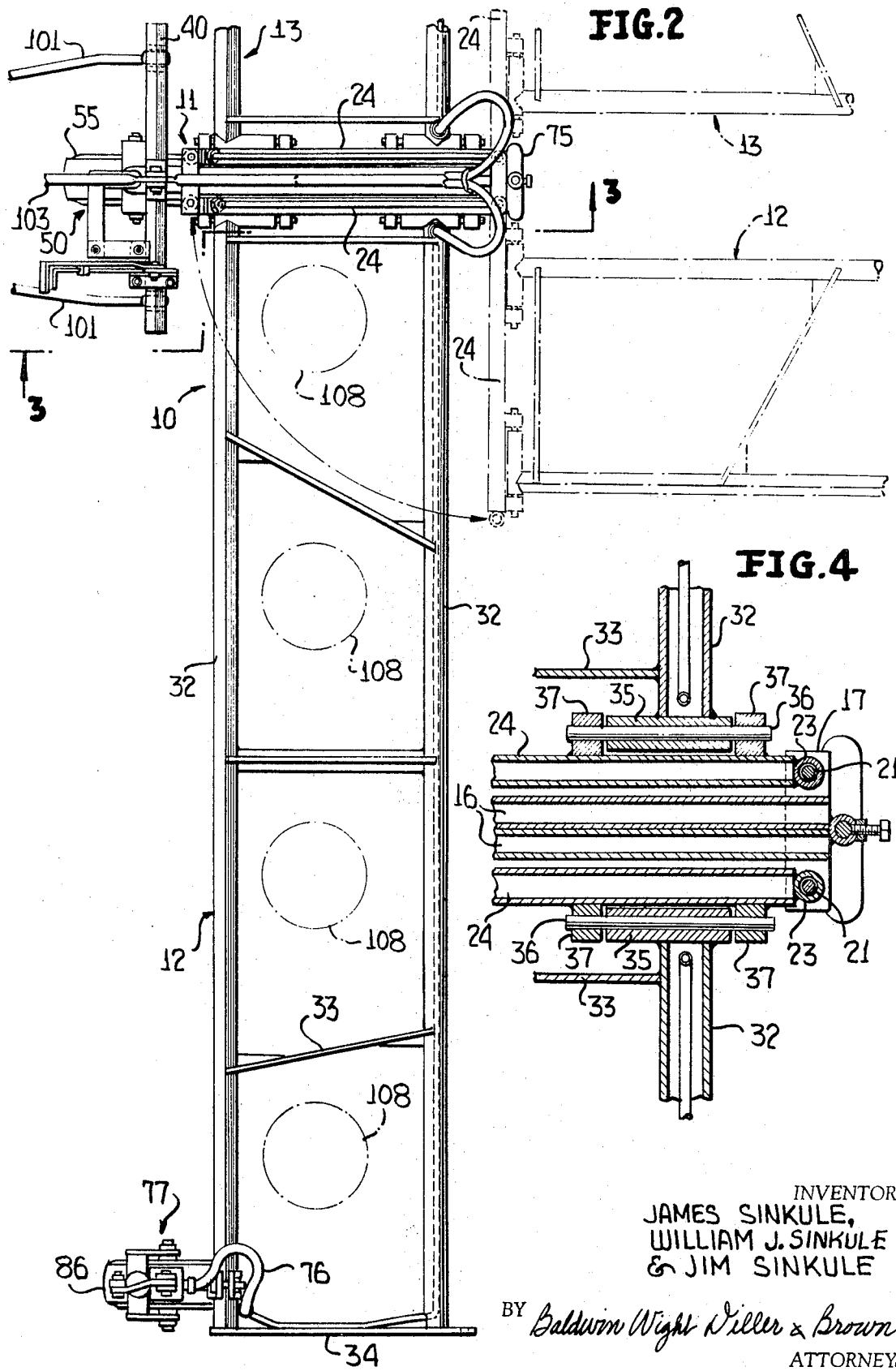

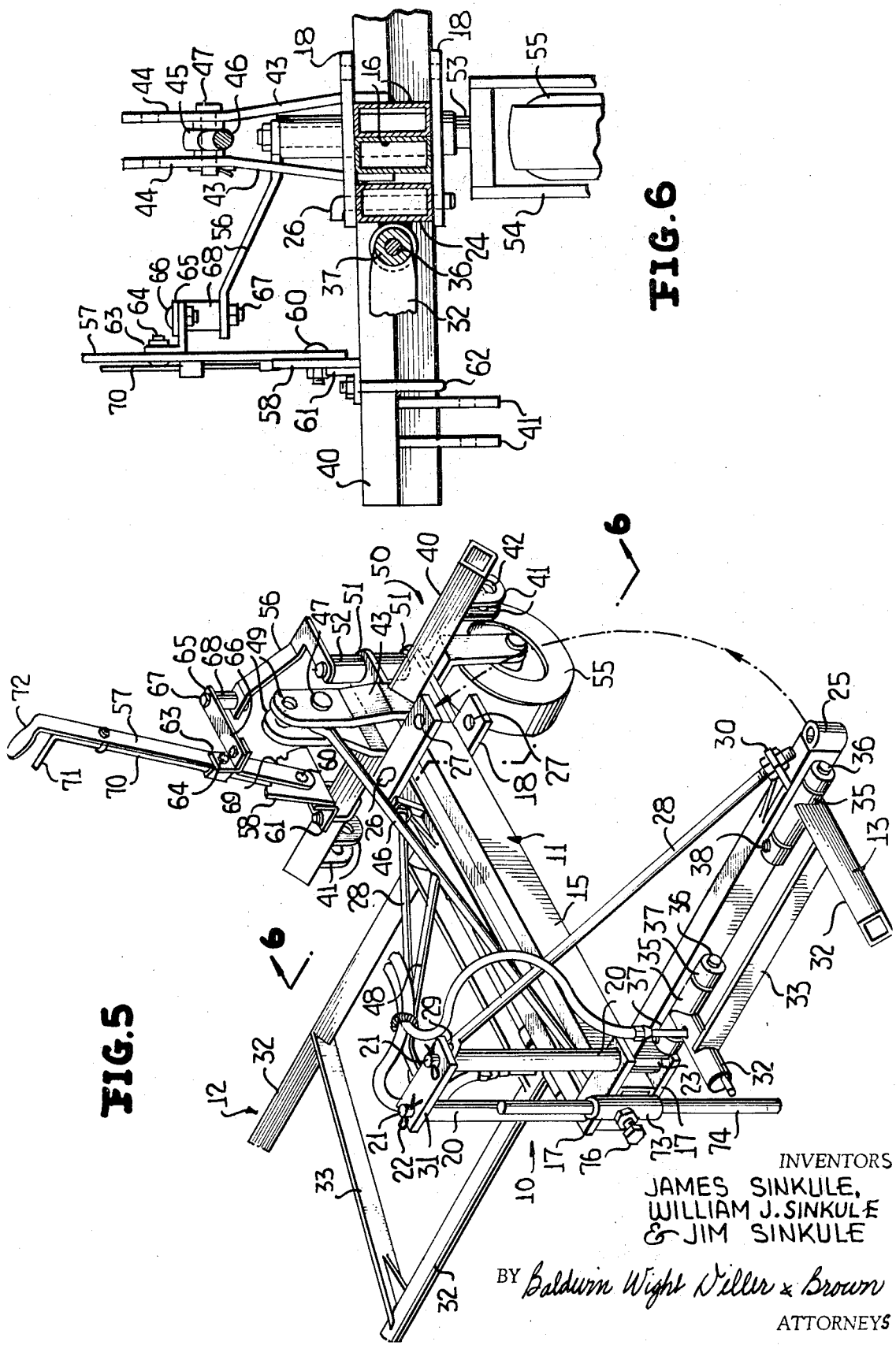

Aug. 11, 1970  J. S. SINKULE ET AL  3,523,699
IMPLEMENT CARRIER
Filed Oct. 23, 1967  4 Sheets-Sheet 4
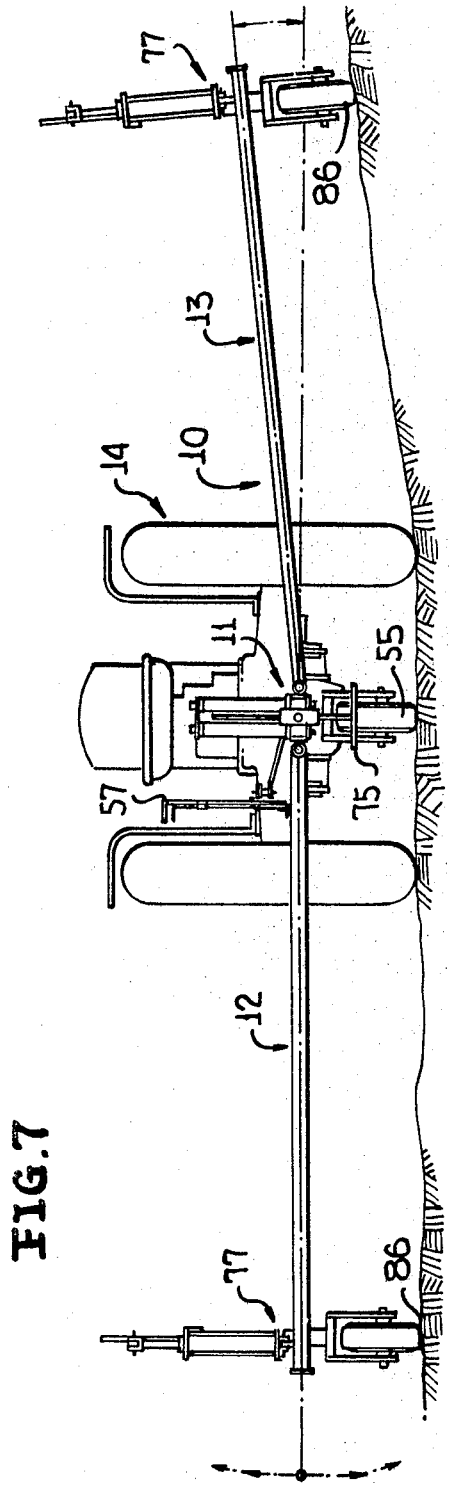
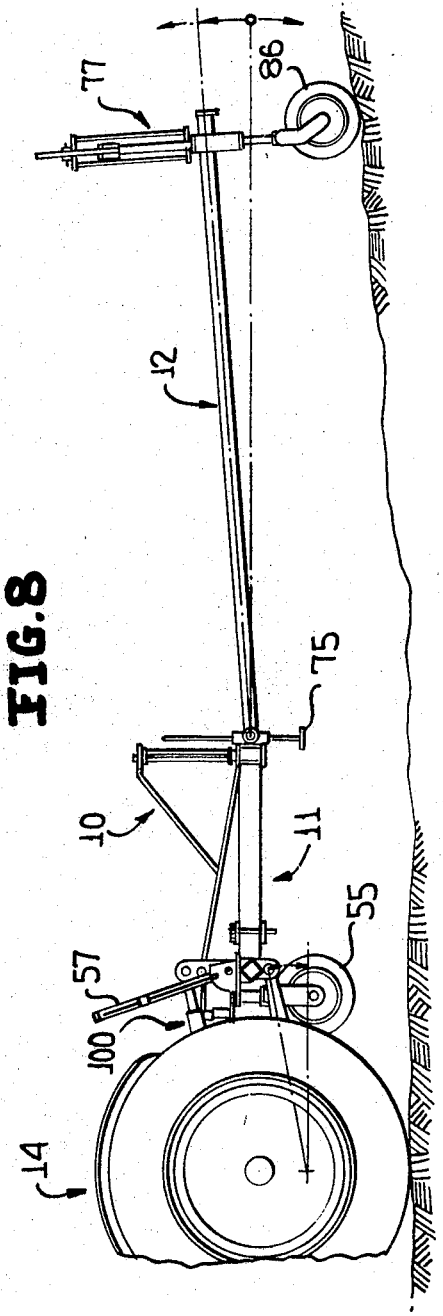
INVENTORS
JAMES SINKULE,
WILLIAM J. SINKULE
& JIM SINKULE
BY *Baldwin Wight Diller & Brown*
ATTORNEYS

United States Patent Office 3,523,699
Patented Aug. 11, 1970

3,523,699
IMPLEMENT CARRIER
James Sinkule, William J. Sinkule, and Jim Sinkule,
all of Rte. 2, West, Tex. 76691
Filed Oct. 23, 1967, Ser. No. 677,288
Int. Cl. B62d 53/00
U.S. Cl. 280—412                 8 Claims

ABSTRACT OF THE DISCLOSURE

An implement carrier which is drawn behind a tractor and in its normal operative position extends beyond the opposite sides of the tractor and carries a plurality of farm implements for simultaneously performing the desired operation on a plurality of crop rows. The carrier includes a central frame unit which is supported by the tractor and outer frame units which are supported by individual wheels. The outer frame units have pivotal connections with the central frame unit of a nature which permits the swinging of the outer frame units into side-by-side trailing relation for passage through a relatively narrow gateway and for individual movement when in their extended operative positions to compensate for variations in the contour of the ground.

---

In order that a necessary operation, such as fertilizing, seeding, etc., may be simultaneously performed on a plurality of crop rows, implement carriers have been provided. These implement carriers are drawn behind a tractor and extend widely to opposite sides of the tractor. The implement carriers are constructed to facilitate the mounting of various farm implements thereon.

In the past, while the implement carriers have satisfactorily performed the required implement supporting operation, there have been deficiencies in the control and handling of implement carriers due to their size. In the first place, the implement carriers must be sufficiently strong so as to absorb any shocks which may be encountered during the normal use thereof. At the same time, they must be constructed so as to follow the contour of the ground.

In accordance with this invention, there is provided an implement carrier which includes a central frame unit having hitch means at the forward end thereof for facilitating the supporting and towing thereof by a tractor. The central frame unit has connected to the opposite sides thereof a pair of outer frame units through a series of alternatively operable pivots whereby relative movement of the outer frame units with respect to the central frame unit may be accomplished. These pivots permit the swinging of the outer frame units from an aligned operative position extending generally transversely of the path of movement of the tractor to a side-by-side trailing position in which the implement carrier may pass through any narrow space through which the tractor will pass. In addition, these pivots provide for the pivoting of the individual outer frame units relative to the central frame unit in accordance with changes in the contour of the ground while the outer frame units are in either the trailing position or the operative position.

Another feature of the implement carrier is that the ends of the outer frame units remote from the central frame unit are supported by wheel assemblies which are adjustable vertically with respect to the outer frame units and wherein the vertical adjustment of the wheel assemblies is in accordance with the vertical adjustment of the lift mechanism of the tractor hitch supporting the central frame unit whereby the entire implement carrier may be simultaneously vertically adjusted by the operator of the tractor.

A further feature of the implement carrier is the provision on the central frame unit of a steerable wheel which may be controlled by the operator of the towing tractor so as to effect a lateral shifting of the entire implement carrier relative to the tractor to assure alignment of implement carried thereby with the crop rows.

With the above and other objects in view that will hereinafter appear, the nature of the invention will be more clearly understood by reference to the following detailed description, the appended claims and the several views illustrated in the accompanying drawings.

In the drawings:

FIG. 2 is a fragmentary plan view of the implement carrier in its extended operative position and shows the same connected to a tractor hitch mechanism, the implement carrier being shown in its trailing position by phantom lines.

FIG. 4 is an enlarged fragmentary horizontal sectional view taken along the line 4—4 of FIG. 3 and shows specifically the details of the principal pivot connections.

FIG. 5 is an enlarged fragmentary rear perspective view of the implement carrier with one outer frame unit in its extended position and the other in its trailing position.

FIG. 6 is an enlarged fragmentary transverse vertical sectional view taken along the line 6—6 of FIG. 5 and shows further the pivot arrangements and the details of the steerable wheel.

FIG. 7 is a rear elevational view of the implement carrier attached to a tractor and shows how one of the outer frame units may pivot relative to the central frame unit in accordance with the contour of the ground.

FIG. 8 is a fragmentary side elevational view of the tractor and implement carrier with the implement carrier in an elevated trailing position and showing how the outer frame units may pivot when in this position in accordance with the ground contour.

The implement carrier, which is generally identified by the numeral 10, includes a central frame unit 11 and a pair of outer frame units 12 and 13, which outer frame units are identical except for being left and right hand units.

Figure 1:
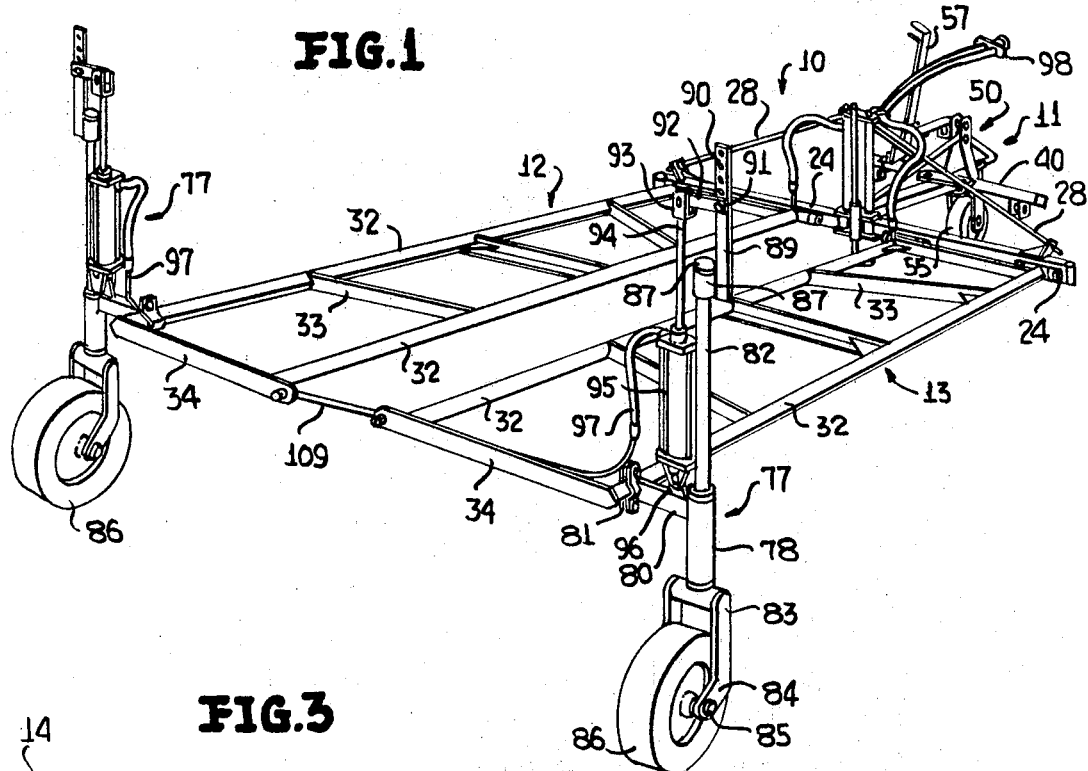
FIG. 1 is a rear perspective view of the implement carrier in its trailing position and detached from a tractor.

The implement carrier 10 is particularly constructed to be towed behind a conventional farm tractor 14 with the outer frame units 12 and 13 in extended positions on opposite sides thereof, as is shown in FIG. 7. However, in order to facilitate the ready towing of the implement carrier 10 when it is not in use, the outer frame units 12 and 13 have pivotal connections with the central frame unit 11 whereby they may be folded to trailing positions in which they are in side-by-side relation, as is shown in FIG. 1. It is to be noted from FIGS. 7 and 8 that in both positions of the outer frame units, the outer frame units are pivotable relative to the central frame unit 11 to compensate for ground contour variations. This is one of the principal features of the invention.

Referring now to FIG. 5 in particular, it will be seen that the central frame unit 11 includes a main frame member 15 which is illustrated in FIG. 6 as being formed of two box sections 16 disposed in upstanding relation and welded together in side-by-side relation, but which main frame member may be of any suitable construction. At the rear end of the main frame member 15 there is a pair of upper and lower transverse plates 17. A similar pair of upper and lower plates 18 are secured to the main frame member 15 adjacent the forward end thereof. The plates 17 and 18 are utilized in the pivotal mounting of the outer frame units 12 and 13.

The upper one of the plates 17 is provided with a pair of upstanding tubular members 20 and an elongated pivot pin 21 extends through each of the tubular members 20. Each pivot pin 21 is of a length to project a short distance above the respective tubular member 20 and below the lower plate 17. Each pivot pin 21 is releasably retained in place by means of a suitable fastening element, such as the cotter pin 22 in the upper end thereof. A pivot sleeve 23 is carried by each of the pivot pins 21 intermediate the plates 17. Each pivot sleeve 23 has secured thereto a support arm 24 which is provided at the opposite end thereof with a locking sleeve 25. It will be readily apparent from FIG. 5 that the support arms 24 are pivotable between a position generally normal to the main frame member 15 and a position alongside the main frame member 15. The support arms 24 are locked in their positions alongside the main frame member 15 by means of locking members 26 which extend through aligned apertures 27 in the plates 18. It is to be noted that the locking members 26 are in the form of rods having offset upper ends and are of a size to be received within the locking sleeves 25.

Each of the support arms 24 is braced by means of a diagonal brace 28 which has an upper end 29 which is journaled on the upper end of the respective pivot shaft and which has its lower end adjustably secured to a mounting plate 30 carried by the respective support arm 24 adjacent the locking sleeve 25 thereof. At this time it is pointed out that the upper ends of the pivot shafts 21 are connected together by a plate 31 which overlies the ends of the diagonal braces 28.

Each of the outer frame units 12 and 13 is pivotally carried by one of the support arms 24. At this time it is pointed out that each of the outer frame units 12 and 13 includes a rectangular frame which is formed of a pair of main frame members 32 which are connected together by suitable transverse frame members 33 which are of a construction and so positioned to provide for the necessary strength of each of the outer frame units 12 and 13 and at the same time to facilitate the conventional mounting of farm implements to be carried by the outer frame units. At this time, it is pointed out that remote from the respective support arm 24, the main frame members 32 are connected together by a transverse frame member 34 which is secured to the ends of the frame members 32 and extends beyond one of the frame members 32 so as to facilitate the connecting together of the remote ends of the outer frame units 12 and 13 when they are in a trailing position, such as that illustrated in FIG. 1. This will be described in more detail hereinafter.

Referring once again to FIG. 5, it will be seen that each of the frame members 32 has secured to the end thereof remote from the transverse frame member 34 a pivot sleeve 35. Each pivot sleeve 35 is carried by a horizontal pivot pin 36 which extends longitudinally of the respective support arm 24 and which is mounted within a pair of sleeves 37 which are suitably secured to the support arm 24 in spaced alignment. Each pivot pin 36 is retained in its respective pair of sleeves 37 by means of a suitable locking member 38.

At the forward end of the main frame member 15 there is a transversely extending hitch bar 40 which is suitably secured to the forward end of the main frame member 15 such as by welding. The hitch bar 40 is provided adjacent the outer ends thereof with pairs of mounting arms 41 having transversely aligned apertures 42 for the reception of suitable pins. The central portion of the hitch bar 40 has a pair of elongated mounting arms 43 extending upwardly therefrom, the mounting arms 43 having lower portions suitably secured to opposite sides of the forward end of the main frame member 15. The mounting arms 43 have transversely spaced parallel upper portions 44 and have positioned between the lower parts thereof a forward end 45 of a rearwardly and downwardly sloping diagonal brace 46. The end 45 of the brace 46 is releasably connected to the mounting arms 43 by means of a suitable anchoring pin 47. The rear end of the diagonal brace 46 is suitably secured to the central portion of the upper plate 17, such as by welding, as is clearly shown in FIG. 3.

A further diagonal brace 48 extends upwardly from the central portion of the diagonal brace 46 to the plate 31. It is to be understood that the brace 48 will be suitably secured, such as by welding, to the brace 46 and the plate 31.

At this time it is pointed out that the upper portions 44 of the mounting arms 43 are provided with transversely aligned apertures 49 above the pin 47 for the reception of a further anchoring pin. It will thus be apparent that suitable anchoring or mounting pins carried by the mounting arms 41 and 43 will provide for a three point suspension of the central frame unit 11 whereby the implement carrier 10 may be readily carried by a conventional tractor, such as the tractor 14, having a three point suspension type hitch.

At the extreme forward end of the central frame unit 11 there is a steerable wheel unit which is generally referred to by the numeral 50. The steerable wheel unit 50 includes a pair of vertically spaced mounting plates 51 which extend forwardly from the forward end of the main frame member 15 and which are suitably secured, such as by welding, to the upper and lower surfaces thereof. The mounting plates 51 carry a tubular support member 52 which extends above and below the mounting plates 51 and which has rotatably journaled therein a shaft 53 which is part of a fork 54 carrying in a conventional manner a wheel 55.

The wheel 55 is steered by means of an arm 56 which is suitably secured to the upper end of the shaft 53 in interlocked relation therewith. It is to be noted that the arm 56 is generally L-shaped in outline and the opposite ends thereof are vertically offset. The arm 56 is positioned by means of an elongated lever 57 which has the lower end thereof pivotally mounted relative to a sector plate 58 by means of a pivot pin 60. The sector plate 58 is carried by an angle bracket 61 which is releasably secured on the hitch bar 40 by means of a U-bolt 62. The lower portion of the lever 57 is provided with an angle bracket 63 which is pivotally connected thereto by means of a pin 64. A link 65 is pivotally connected to the bracket 63 by means of a pin 66 and to the arm 56 by means of a pin 67. It is to be noted that the link 65 is spaced from the arm 56 by means of a spacer 68 carried by the pin 67.

At this time it is pointed out that the sector plate 58 is provided with a plurality of notches 69 in which a lower end of a locking rod 70 slidably carried by the lever 57 may be positioned to lock the lever 57 and the wheel 55 in an adjusted position. Both the rod 70 and the lever 57 are provided with suitable handle portions 71 and 72, respectively, both to facilitate the movement of the rod 70 to a released position and to effect the movement of the lever 57 to an intended new position.

Figure 3:
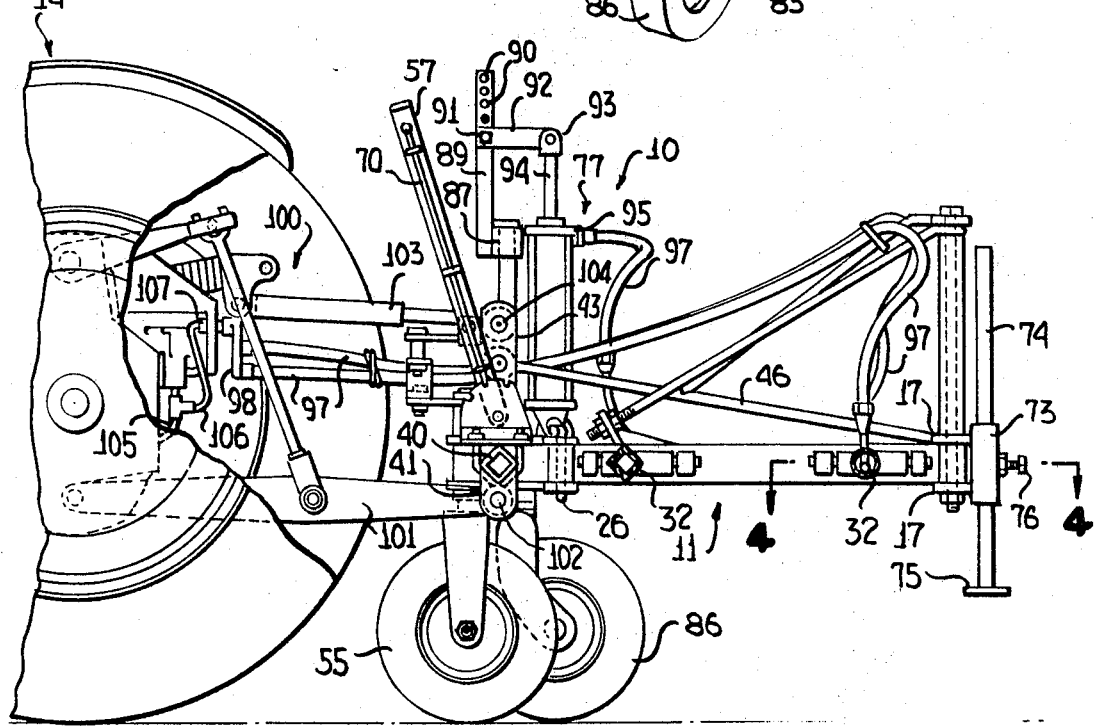
FIG. 3 is a fragmentary longitudinal vertical sectional view taken generally along the line 3—3 of FIG. 2 and shows further the details of the implement carrier and the relationship thereof to a towing tractor.

At this time it is pointed out that the central frame unit 11 is also provided with a rear support which would be utilized in conjunction with the steerable wheel 55 to support the implement carrier 10 when it is not attached to a tractor. In FIGS. 3 and 4 it is shown that there is welded to the rear edges of the central portions of the plates 17 a vertical sleeve 73. The sleeve 73 has an elongated support rod 74 slidably positioned therein. The lower end of the support rod 74 is provided with a ground engageable foot 75. The sleeve 73 is provided with a set screw 76 which may be utilized to lock the support rod 74 in any desired position.

Referring once again to FIG. 1, it will be seen that each of the outer frame members 12 and 13 is provided with a supporting wheel assembly, generally referred to by the numeral 77, adjacent the end thereof remote from the central frame unit 11. Each wheel assembly 77 is releasably carried by the main frame member 32 of its respective outer frame unit which is disposed forwardmost in the operative position of the implement carrier, as is shown in FIG. 2. Each wheel assembly 77 includes an upstanding tubular support member 78 which is carried by a horizontal mounting arm 80 which, in turn, is provided with a suitable mounting unit 81 releasably clamping the same to the associated frame member 32.

The tubular support member 78 has mounted therein for freedom of rotation and vertical sliding movement by any desired type of bearing means (not shown) a vertical shaft 82 which is part of a fork 83. The fork 83 has an offset lower portion 84 which carries an axle 85 on which a wheel 86 is rotatably journaled. It thus will be apparent that the wheel 86 is of the caster type and is free to swivel in accordance with the direction of movement of the implement carrier 10.

At the upper end of the shaft 82 there is a sleeve 87 which is fixed against movement longitudinally of the shaft 82 by suitable means including an enlarged head 88 on the shaft 82. The shaft 82 is, however, free to rotate relative to the sleeve 87. An upstanding arm 89 is rigidly secured to the sleeve 87. The upper end of the arm 89 is provided with a plurality of apertures 90 through which a pin 91 is selectively positioned to connect to the arm 89 a link 92. The opposite end of the link 92 is secured to a bifurcated fitting 93 carried by an upper end of a piston rod 94 of an extensible fluid motor or cylinder 95. The fluid motor 95 has its lower end pivotally secured to a mounting bracket 96 carried by the mounting arm 80.

It will be readily apparent that in the implement carrier position of FIG. 1, the tubular member 78 is prevented from moving downwardly by the fork 83. This is the lowermost position of the respective outer frame units 12 and 13. When it is desired to elevate the ends of the outer frame units 12 and 13 remote from the central frame unit 11, fluid under pressure is applied to the upper end of the cylinder 95 through a fluid line 97 and the piston rod 94 is moved downwardly into the cylinder 95. This results in the sleeve 87 being forced downwardly with the further result that the shaft 82 is moved downwardly. The fork 83 thus moves downwardly relative to the tubular member 78 and inasmuch as the wheel 86 is resting on the ground, the respective outer frame unit must move upwardly.

It will be seen from FIGS. 1 and 2 that the fluid lines 97 from the cylinders 95 extend along the transverse frame members 34 and then into the adjacent ones of the longitudinal frame member 32. The fluid lines 97 exit from the respective frame members 32 adjacent the respective pivot sleeves 35 (FIG. 5) and then extend generally forwardly of the central frame unit 11 to a conventional fitting 98 where the fluid lines are joined together and which fitting may be utilized to couple the fluid lines to a hydraulic system of a tractor. At this time it is pointed out that the fluid lines 97 preferably are formed partially of tubing and partially of flexible hoses both for the purpose of facilitating the handling thereof and to prevent accidental rupture due to vibration, etc.

Referring now to FIG. 3 in particular, it will be seen that there are illustrated the general details of the mounting of the implement carrier 10 on the tractor 14. The tractor 14 is of a conventional construction and includes a three poine hitch assembly which is generally referred to by the numeral 100. The hitch assembly includes a pair of transversely spaced lower hitch arms 101 which have their forward ends suitably pivotally mounted on the tractor and which have their rear ends extending rearwardly beyond the tractor. The rear ends of the lower hitch arms 101 are releasably secured to the central frame unit 11 by means of pins 102 passing through the apertures 42 of the mounting arms 41. The hitch 100 also includes an upper hitch arm 103 which is centrally located and which has its forward end anchored to the tractor in a conventional manner. The rear end of the hitch arm 103 is received between the upper portions 44 of the mounting arms 43 and is releasably secured to the central frame unit 11 by means of a pin 104 passing through the aperture 49 of the mounting arms 43.

It is to be understood that the hitch is of a type wherein in addition to towing an implement, the height of an implement may be controlled by raising and lowering the hitch arms 101. The manner in which this is accomplished varies with the different tractors. However, in each instance at least one hydraulic cylinder is utilized and fluid to the hydraulic cylinder is directed through a fluid line 105. In accordance with this invention, the fluid line 105 is provided with a branch 106 which is coupled to a fitting 107. The fitting 107 is a mate to the fitting 98 whereby the fluid lines 97 may be readily coupled to the hydraulic system of the tractor 14. It is to be understood, of course, that the fittings 98 and 107 are of the automatic shut-off type whereby loss of hydraulic fluid is prevented.

At this time, it is pointed out that the lever 57 for controlling the position of the steerable wheel 55 is positioned immediately adjacent the rear of the tractor 14 at a point where it may be readily engaged by the operator of the tractor so as to effect the desired side shifting of the implement carrier 10 relative to the tractor 14 in order to maintain the required alignment with crop rows.

OPERATION

In the normal use of the implement carrier 10, the desired implements, which are schematically illustrated in FIG. 2 and identified by the numeral 108, are mounted on the outer frame units 12 and 13. These implements may be fertilizers, seeders, etc. The central frame unit 11 is secured to the tractor 14 by means of the tractor hitch 100 in the manner set forth above. At this time the outer frame units 12 and 13 are in their extended positions on opposite sides of the central frame unit 11. Also, the support shaft 74 and its associated foot 75 are elevated, as is shown in FIG. 3. The hitch 100 is adjusted so that the steerable wheel 55 is engaged with the ground so that transverse shifting of the implement carrier 10 relative to the tractor may be ecected if it is so desired. The outer ends of the outer frame units 12 and 13 are supported by the wheel assembly 77.

Referring now to FIG. 7 in particular, it will be seen that the outer frame units 12 and 13 are free to hinge relative to the central frame unit 11 about longitudinal axes so as to compensate to changes in the ground contour. In the event the operator of the tractor 14 desires to elevate the implements carried by the implement carrier 10, it is merely necessary for him to actuate the hitch elevating mechanism with the result that the hitch 100 will elevate the central frame unit 11. Hydraulic fluid is then automatically delivered to the fluid cylinders 95 and the outer ends of the outer frame units 12 and 13 are automatically elevated in the same general relation as the vertical movement of the central frame unit 11.

When it is desired to move the tractor and the implement carrier through a relatively narrow space, such as through a gateway, it is merely necessary to remove the locking pins 26. Then, as the tractor and the central frame unit 11 moves forwardly, the outer frame units 12 and 13 will swing around to trailing positions, such as those shown in FIGS. 1 and 2. If desired, the outer frame units 12 and 13 may be locked in parallel relation in their trailing positions by means of a connecting rod 109 which may interlock the extending portions of the frame members 34 in the manner shown in FIG. 1. It will be apparent from FIG. 8 that in order to prevent damage to the implements carried by the implement carrier 10, when the implement carrier 10 is in its trailing position of FIGS. 1 and 2, it will be elevated in the manner described above. At this time, it is to be noted that the outer frame units 12 and 13 are free to pivot about a transverse axis with respect to the central frame unit 11 so as to compensate for changes in the ground contour.

When the implement carrier 10 is not in use, the central frame unit 11 is supported by the steerable wheel 55, and the support rod 74, which support rod 74 is lowered prior to the detachment of the implement carrier 10 from the tractor 14. The outer frame units 12 and 13 are supported partially by the central frame unit 11 and partially by the wheel assemblies 77.

It is to be understood that the materials utilized in the construction of the various frame elements and the manner in which the various frame elements are reinforced may be varied as desired by the builder. Furthermore, although only a preferred embodiment of the invention has been specifically illustrated and described herein, it is to be understood that other variations may be made in the construction of the implement carrier without departing from the spirit and scope of the invention, as defined by the appended claims.

What is claimed as new:

1. An implement carrier comprising a generally T-shaped central frame unit having forward and trailing ends, said T-shaped central frame unit being formed by a transverse frame portion at said forward end and a longitudinal main frame portion disposed generally medially of said transverse frame portion and projecting toward said trailing end, three-point suspension hitch means carried by said transverse frame portion for facilitating the towing of said central frame unit, said three-point suspension hitch means being defined by a hitch member carried by said transverse frame portion at each side of said longitudinal main frame portion, another hitch member carried by said transverse frame portion medially between and above said first-mentioned hitch members, a pair of outer frame units, and attaching means at said trailing end disposed between each of said outer frame units and said main frame portion mounting said outer frame units on said main frame portion for movement between a transversely aligned extended position and a side-by-side trailing position, for vertical tilting relative to said central frame unit, each of said attaching means includes a support member, and a vertical axis pivot between the trailing end of said main frame portion mounting said support member for movement between a side-by-side position along-side said main frame portion in a position generally normal thereto.

2. An implement carrier comprising a generally T-shaped central frame unit having forward and trailing ends, said T-shaped central frame unit being formed by a transverse frame portion at said forward end and a longitudinal main frame portion disposed generally medially of said transverse frame portion and projecting toward said trailing end, hitch means carried by said transverse frame portion for facilitating the towing of said central frame unit, a pair of outer frame units, and attaching means at said trailing end disposed between each of said outer frame units and said main frame portion mounting said outer frame units on said main frame portion for movement between a transversely aligned extended position and a side-by-side trailing position, and for vertical tilting relative to said central frame unit, each of said attaching means includes a support member, a vertical axis pivot between the trailing end of said main frame portion mounting said support member for movement between a side-by-side position alongside said main frame portion and a position generally normal thereto, and a horizontal axis pivot between said support member and a respective one of said outer frame units.

3. The implement carrier of claim 1 including a wheel support on each outer frame unit remote from the central frame unit cooperating with said central frame unit to support each outer frame unit, hydraulic means for adjusting each wheel support, and said hydraulic means including conduit means which are positioned at least in part internally of portions of said outer frame units.

4. An implement carrier comprising a generally T-shaped central frame unit having forward and trailing ends, said T-shaped central frame unit being formed by a transverse frame portion at said forward end and a longitudinal main frame portion disposed generally medially of said transverse frame portion and projecting toward said trailing end, hitch means carried by said transverse frame portion for facilitating the towing of said central frame unit, a pair of outer frame units, and attaching means at said trailing end disposed between each of said outer frame units and said main frame portion mounting said outer frame units on said main frame portion for movement between a transversely aligned extended position and a side-by-side trailing position, for vertical tilting relative to said central frame unit, each of said attaching means includes a support member, an upstanding post in part defining a vertical axis pivot between the trailing end of said main frame portion mounting said support member for movement between a side-by-side position alongside said main frame portion and a position generally normal thereto, a horizontal axis pivot between said support member and a respective one of said outer frame units, and a brace between each upstanding post and an end of each support member remote from the attaching means thereof.

5. The implement carrier as defined in claim 2 including means for releasably locking each support member in its side-by-side position alongside said main frame portion.

6. The implement carrier of claim 2 including a steering unit carried by said central frame unit at said forward end for effecting side wall shifting of said central frame unit relative to a towing tractor, said steering unit including a steerable wheel positioned at the forward end of said central frame unit, and control mechanism for said steerable wheel positioned for operation by an operator of a towing tractor.

7. An implement carrier comprising a generally T-shaped central frame unit having forward and trailing ends, said T-shaped central frame unit being formed by a transverse frame portion at said forward end and a longitudinal main frame portion disposed generally medially of said transverse frame portion and projecting toward said trailing end, hitch means carried by said transverse frame portion for facilitating the towing of said central frame unit, a pair of outer frame units, and attaching means at said trailing end disposed between each of said outer frame units and said main frame portion mounting said outer frame units on said main frame portion for movement between a transversely aligned extended position and a side-by-side trailing position, for vertical tilting relative to said central frame unit, a wheel support on each outer frame unit remote from said central frame unit cooperating with said central frame unit to support each outer frame unit, means for adjusting each wheel support from a position adjacent an operator of a towing tractor, a steering unit carried by said central frame unit at said forward end for effecting sidewise shifting of said central frame unit relative to a towing tractor, said steering unit including a steerable wheel positioned at the forward end of said central frame unit, a control mechanism for said steerable wheel positioned for operation by an operator of a towing tractor, and control means for vertically adjusting said last-mentioned steering unit.

8. An implement carrier comprising a generally T-shaped central frame unit having forward and trailing ends, said T-shaped central frame unit being formed by a transverse frame portion at said forward end and a longitudinal main frame portion disposed generally medially of said transverse frame portion and projecting toward said trailing end, hitch means carried by said transverse frame portion for facilitating the towing of said central frame unit, a pair of outer frame units, and attaching means at said trailing end disposed between each of said outer frame units and said main frame portion mounting said outer frame units on said main frame portion for movement between a transversely aligned extended position and a side-by-side trailing position, for vertical tilting relative to said central frame unit, a wheel support on each outer frame unit remote from said central frame unit cooperating with said central frame unit to support each outer frame unit, means for vertically adjusting each wheel support, a steerable wheel support carried by said central frame unit for effecting sidewise shifting of said central frame unit relative to a towing tractor, said steering unit including a steerable wheel positioned at the forward end of said central frame unit, a control mechanism for said steerable wheel positioned for operation by an operator of a towing tractor, and means for vertically adjusting said steerable wheel to adjust said central frame unit in unison with the vertical adjustment of said wheel supports.

References Cited

UNITED STATES PATENTS

| | | | |
|---|---|---|---|
| 2,641,886 | 6/1953 | Graham | 172—311 |
| 2,727,453 | 12/1955 | Altgelt et al. | 172—310 X |
| 2,778,182 | 1/1957 | Malmgren. | |
| 2,828,597 | 4/1958 | Moore | 172—626 |
| 2,871,028 | 1/1959 | Hibbard | 172—311 X |
| 2,947,372 | 8/1960 | Olson | 172—624 |
| 3,093,394 | 6/1963 | McCollum. | |
| 3,162,459 | 12/1964 | Marmorine et al. | 280—413 X |
| 3,376,050 | 4/1968 | Lohrman | 172—311 X |
| 3,414,064 | 12/1968 | Foster | 172—311 |

FOREIGN PATENTS 230,279   6/1960   Australia.

LEO FRIAGLIA, Primary Examiner

U.S. Cl. X.R.

172—311